United States Patent [19]

Connor et al.

[11] Patent Number: 4,511,044
[45] Date of Patent: Apr. 16, 1985

[54] SEAL FORCE MONITOR APPARATUS, SYSTEM, AND METHOD FOR IN-PROCESS DETERMINATION OF INTEGRITY OF SEALED CONTAINERS

[75] Inventors: John T. Connor, Norristown; Charles P. Halsted, Oreland, both of Pa.; Jacob Ravn, Solvang, Calif.

[73] Assignee: The West Company, Phoenixville, Pa.

[21] Appl. No.: 351,660

[22] Filed: Feb. 24, 1982

[51] Int. Cl.³ .......................... B07C 5/34; G01M 3/00
[52] U.S. Cl. ..................................... 209/522; 53/334; 73/862.53; 209/529; 209/597; 364/552
[58] Field of Search ............... 209/522, 523, 529, 530, 209/571, 597, 599, 552, 604, 699, 928, 546, 600; 73/862.53, 862.54, 862.64, 52, DIG. 4, 862.68; 53/324, 325, 329, 334, 357, 488; 364/552, 507, 508, 468, 558

[56] References Cited

U.S. PATENT DOCUMENTS

| | | | |
|---|---|---|---|
| 3,771,649 | 11/1973 | Strauss | 209/522 |
| 3,862,408 | 1/1975 | Bolt | 364/558 |
| 4,048,848 | 9/1977 | Dybel | 73/DIG. 4 |
| 4,213,329 | 7/1980 | Raymond et al. | 209/599 |
| 4,219,986 | 9/1980 | Osterhaus | 53/334 |
| 4,289,022 | 9/1981 | Dybel et al. | 73/862.68 |
| 4,337,644 | 7/1982 | Leiter | 73/52 |
| 4,432,246 | 2/1984 | Granat | 73/862.53 |

Primary Examiner—David A. Scherbel
Assistant Examiner—Donald T. Hajec
Attorney, Agent, or Firm—Eugene E. Renz, Jr.

[57] ABSTRACT

A system and method for determining the integrity of a sealed container closure assembly wherein the closure is secured to the container by a force applying member and the integrity is determined by converting the force used to secure the closure into a force signal and comparing the force signal to a reference signal, which is reflective of the force used during a closure operation which resulted in seal integrity. The force signal which comprises a series of electrical signals is compared to a series of corresponding reference signals or is a single signal compared to a reference signal at a plurality of points during the closure operation. An indicator is used to indicate when a preselected number of acceptable or non-acceptable comparisons are reached.

10 Claims, 17 Drawing Figures

SEAL FORCE MONITOR APPARATUS, SYSTEM, AND METHOD FOR IN-PROCESS DETERMINATION OF INTEGRITY OF SEALED CONTAINERS

BACKGROUND OF THE INVENTION

The present invention relates to method, apparatus and system for determining, in-process, the integrity of sealed containers. The invention has particular application to parenteral pharmaceutical products which are typically packaged in rigid glass containers sealed with a combination rubber and metal closure.

Such pharmaceutical products are usually packaged by high speed automatic filling and capping equipment. The containers or bottles are filled with the medicament at a filling station and thereafter the closure assembly consisting generally of a resilient sealing element made of rubber and a cup-like cap made of aluminum is placed over the discharge end of the container. The capping apparatus then acts to apply a predetermined force to the cap to seat the closure assembly and to crimp the lower edge of the skirt of the cap under or around the bottle finish or flange to seal the container. More specifically during the capping operation the resilient sealing element is compressed between the end face of the container and the cap and held in a compressed state by crimping the cap to the container. The integrity and adequacy of the seal is a function of the percent compression of the sealing element or expressed another way, the magnitude of the sealing force of the seal against the container around the periphery of the opening in the container. Proper sealing for medicaments is important to prevent exposure to air or loss by evaporation and also to protect the contents from microbiological or other contamination.

It has been found that some containers packaged by mass production techniques are not adequately sealed. The seal is controlled primarily by the capping equipment. For example, for a given cap, resilient sealing element and container assembly, the bottle-raising or cap lowering means of the sealing apparatus is initially set to apply a predetermined force to effect a given compression of the resilient sealing element to produce the proper seal. If the initial setting of the sealing apparatus is incorrect, the seal produced is inadequate. For example, if the preload force in the bottle-raising or cap lowering means is too low, the resilient sealing element is not compressed sufficiently to seal and if too high there is the danger of metal cap distortion, dimpling of the top surface of the resilient sealing element or glass breakage. Even if the initial setting of the sealing apparatus is correct, the setting may require adjustment by the operator from time to time and if these changes are inadvertently overlooked, inadequate sealing may result.

Presently there are various apparatus and systems for in-process determination of seal integrity of various types of containers which perform generally the functions of sensing, analyzing and removing defective sealing means.

For instance, in a system for checking seal integrity which is the subject of U.S. Pat. No. 3,206,025 means are provided for detecting the post-seal evacuated height of flexible container-closure assembly. The flexible cover is adapted to flex from a normal position to a downwardly generally concave position indicating a properly sealed package. An improperly sealed container would be one in which the cover is in a generally upwardly protruding convex position indicating the vacuum seal has been broken. The sealed packages are moved below a microswitch which comprises a top "feeler finger" or detecting arm adapted to overlie the cover so that it will sense whether the cover portion is up or down. Also provided by this patent is a memory storage circuit which in conjunction with the microswitch will act to reject an improperly evacuated container.

In another system for checking seal integrity which is the subject of U.S. Pat. No. 4,213,329 Raymond et al, METHOD AND APPARATUS FOR INSPECTING CONTAINERS a method and apparatus are provided for inspecting vacuum-packed containers. The invention comprises automatically subjecting each container to be inspected to a predetermined force so as to cause each container to emit a click as a result of relative displacement of the container and its liquid contents and determining whether the container has adequate vacuum by measuring the time interval between application of the predetermined force and the occurrence of the click.

In yet another system for checking seal integrity, U.S Pat. No. 2,689,647 Hofstetter et al, BOTTLE CAP POSITION DETECTOR, a device for detecting and rejecting containers having screw caps containing sealing liners which engage against the mouth rims of the bottles is provided. In the machine application of the caps to the bottles, an occasional cap may have been misapplied to the bottle for any of various reasons including misalignment of the cap and bottle threads resulting in a "cocked" position of the cap on the bottle, as well as accidental exclusion of the liner from the cap or the inclusion of more than the proper single liner. In Hofstetter, the detector is an assembly comprising a holder, a movable detector finger, and a switch actuated by the movable detector finger to reject faultily capped bottles. The holder is adapted to ride upon the bottle flange as the bottles are advanced beneath and past the detector finger. The assembly is adjustable to a predetermined spacing so that bottles lacking liners or, where the cap has been screwed in a cocked position, the finger will detect the improperly sealed bottle and through an appropriate switch actuate a mechanism for rejection of the bottle. A normally and properly applied cap will deflect the finger to only a limited degree and to which the switch control is unresponsive in its rejecting function.

Another invention, U.S. Pat. No. 3,469,689, O'Neill, IMPROPERLY SEALED-CONTAINER REJECTOR, describes an apparatus for electronically detecting and rejecting improperly sealed containers utilizing a proximity detector which controls the frequency of an oscillator in response to the distance between the detectors and containers' top sealed under vacuum. The process of sealing under vacuum causes container lids to flex inwardly under atmospheric pressure. If for some reason the container is not properly sealed, the cap will not deflect the intended degree. Thus the degree of deflection of the cap or container end can be relied on to separate the improperly sealed containers from the properly sealed containers. In this invention a plastic mounting sled or skid is supported by a flat spring or resilient member along the longitudinal path of movement of the jars. The sled is normally supported at a predetermined height so that proximity sensor housed within the plastic sled can detect the requisite degree of deflection of the top surface of the jar lid. This arrangement makes it essential that the measurement be taken at a corresponding center location on the jar lid for each successive jar. To insure reading at this center position, a side probe is provided housing a second proximity sensor. These sensors work in conjunction with an air nozzle which is activated to knock the jar off the side of the conveyor when an improperly sealed jar passes the sensor.

The foregoing inventions pertain only to vacuum packed containers, whereas the present invention can be applied to either vacuum or non-vacuum packed containers and differs in the means for determining a properly or improperly sealed container. Also in the foregoing inventions, the means of detecting properly or improperly sealed containers rely on displacement measurements of the containers metallic or rigid top whereas the present invention relies on measuring the applied seal force on a resilient container top and comparing the applied seal force to a predetermined idealized standard. In the present invention, the sensing means is provided by a force transducer integral with the container sealing apparatus and responds to the force exerted on the sealing means during the sealing process. The response to the force is then electronically compared in near real time to predetermined force values taken on an ideally sealed assembly of an identical container. Containers which are improperly sealed will exhibit force values which deviate from the standard and will be automatically ejected, inprocess, from the conveyor.

Accordingly, it is an object of this invention to provide a unique and improved apparatus, system and method for electronically detecting, in-process, properly and improperly sealed containers and for ejecting improperly sealed containers.

Another object of the present invention is to provide an apparatus, system, and method capable of high-speed, uninterrupted operation for one hundred percent seal integrity inspection.

Another object of the present invention is to provide a force measuring transducer integral with the pressure block or integral with the sealing cam.

Another object of the present invention is to provide a means for sampling the force applied to the cap as it is being applied.

Another object of the present invention is to provide a means of comparing the force values against predetermined standard force values.

Another object of the present invention is to provide a means for automatic rejection of improperly sealed containers.

Another object of the present invention is to detect and arrange for the rejection of containers with gross and/or marginal defects.

Another object of the present invention is to provide displays of the number of good and defective containers.

Another object of the present invention is to provide a display showing production rate.

Another object of the present invention is to provide outputs of all operating parameters and information and to perform statistical evaluations.

Another object of the present invention is to provide outputs for closing down the capper if a pre-selected, programmable number of consecutive rejects are detected.

DESCRIPTION OF THE DRAWINGS

The present invention has various additional features and objects as well as numerous novel structural aspects and details, all of which however will be understood most readily and to best advantage from the following detailed description of a typical and illustrative embodiment of the invention shown by the accompanying drawings, in which:

FIG. $1^a$ is a schematic plan view of device and process of the invention;

FIG. 2 is an enlarged scale front elevation view of the container with resilient seal and cap engaging the pressure block prior to cap crimping operation with integrally mounted force transducer. The graph to the left of the drawing shows a typical voltage - time curve produced by the force transducer during this portion of the sealing process;

FIG. 3 shows the cap crimping operation and a typical, full cycle voltage - time curve produced by the force transducer;

FIG. 10 is a typical standard force-time curve generated by an ideally sealed container shown as a solid line and acceptable deviations from the standard curve shown by the shaded areas. The curve shows the force variation during various operations of the sealing process—(a) lifting of the container onto the pressure block where the initial compression force is applied to the resilient seal; (b) & (c) additional compressive force being applied to the resilient seal during the crimping interval; (d) easing of the applied force as the container is retracted from the pressure block. Also shown on FIG. 10 are applied force values lying outside the acceptable limits of a properly sealed container. A container exhibiting a pre-determined number of points lying above or below the acceptable limits would be rejected;

DESCRIPTION OF THE PREFERRED EMBODIMENTS

The present invention provides apparatus, system and method for checking seal integrity of container-closure assemblies for pharmaceutical products such as serums by high-speed in-line process.

The apparatus and system of the present invention is illustrated and described herein with reference to a typical container-closure assembly P for medicaments such as serums. Referring to FIG. 3, the container-closure assembly includes a bottle B, a closure C including a resilient sealing element S such as rubber, engaging over the discharge opening in the bottle and a metal cap C having a top $C_t$ and a peripheral skirt $C_s$ made of a thin gauge aluminum so that the lower edge of the skirt can be crimped or rolled to form a return flange $C_f$ engaging under the bottle finish to maintain the sealing element S in a compressed state. The invention has application to other types of assemblies incorporating resilient sealing elements.

The compression of a resilient sealing element resulting from the capping operation is the main factor determining seal integrity. However, there are a number of variables in the operation whereby the actual compression of the resilient sealing element may vary from one sealed container-closure assembly to the next. For better understanding of the present invention, consider briefly the capping process. The sealing apparatus applies an external compressive force to the closure cap C which compresses the resilient sealing elements and when the outer metal cap C is crimped under the finish on the container, the cap serves as a clamp to maintain the resilient sealing elements in a compressed state and thereby provide a seal between the resilient sealing elements and the container B adjacent the opening. The compression loads the resilient sealing elements in much the same manner as a mechanical compression spring is loaded when it is compressed. As a result substantially all of the external force applied to the closure in the capping apparatus remains resident in the resilient sealing element after capping is completed. It is the residual static force in the resilient sealing element combined with the compliance of the resilient sealing element to the glass surface of the container which produces the sealing characteristic of the closure. If this residual static force exceeds a certain level, which can be determined empirically in a given container-closure assembly for acceptable sealing, then the seal is acceptable.

Figure 1:
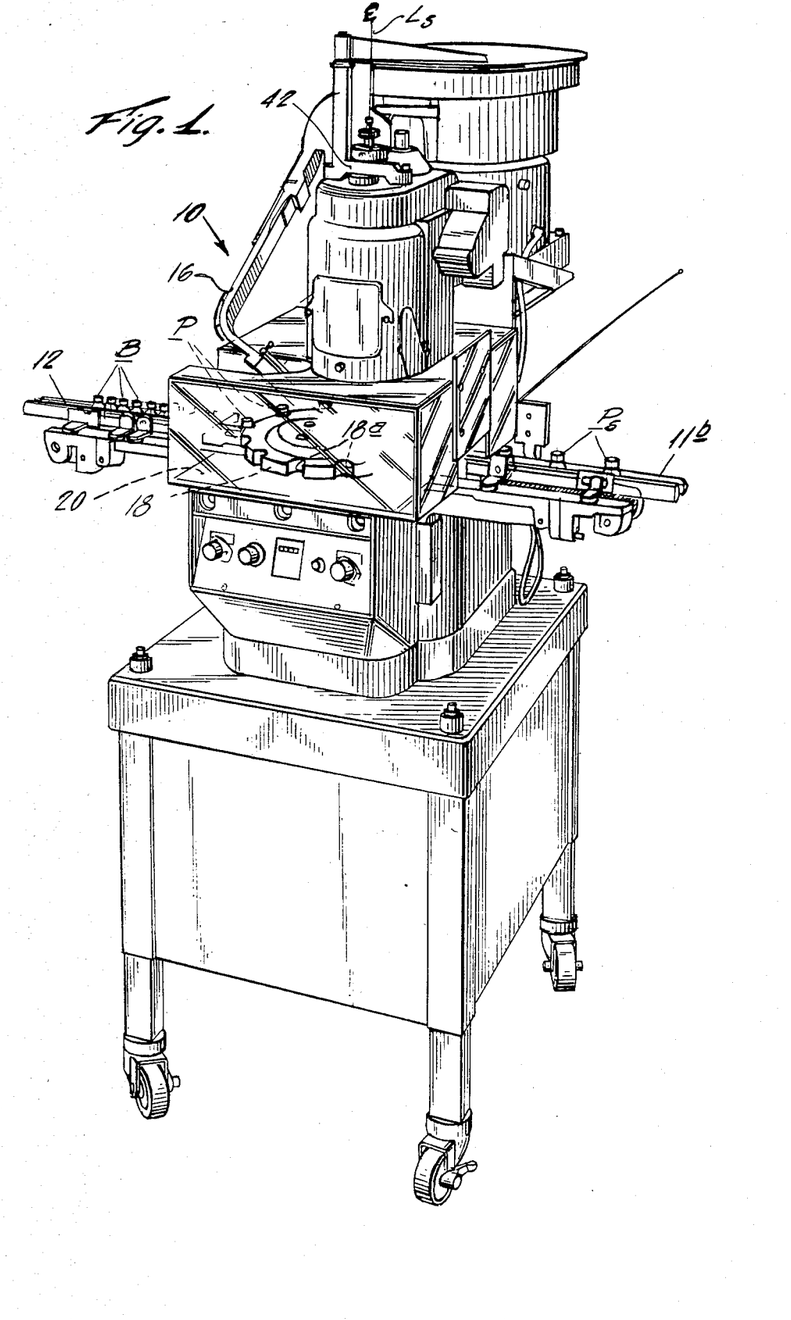
FIG. 1 is a general perspective view of the container capping and sealing apparatus incorporating the detection system of the present invention.
Figures 1A, 2, 3:
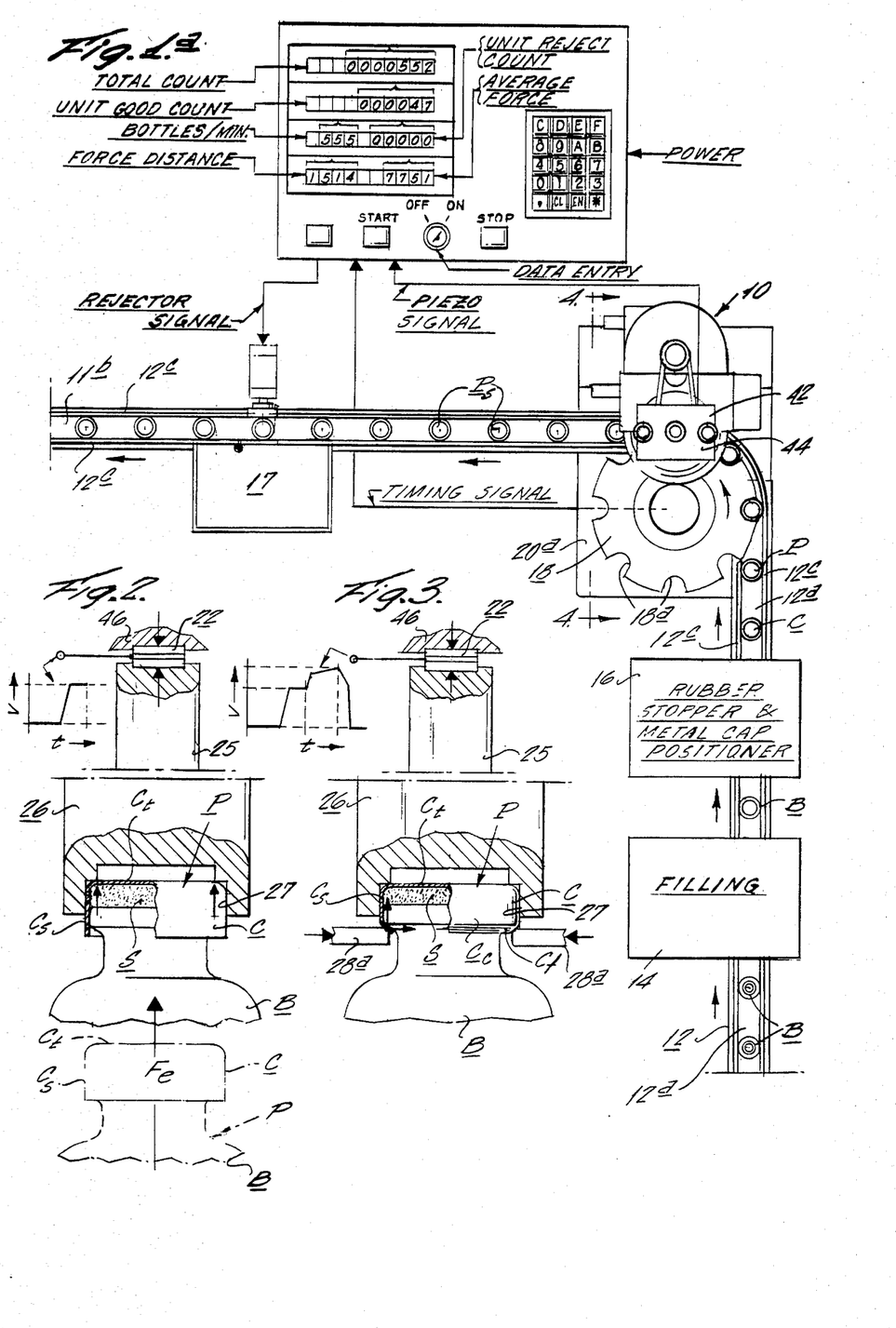
Figure 4:
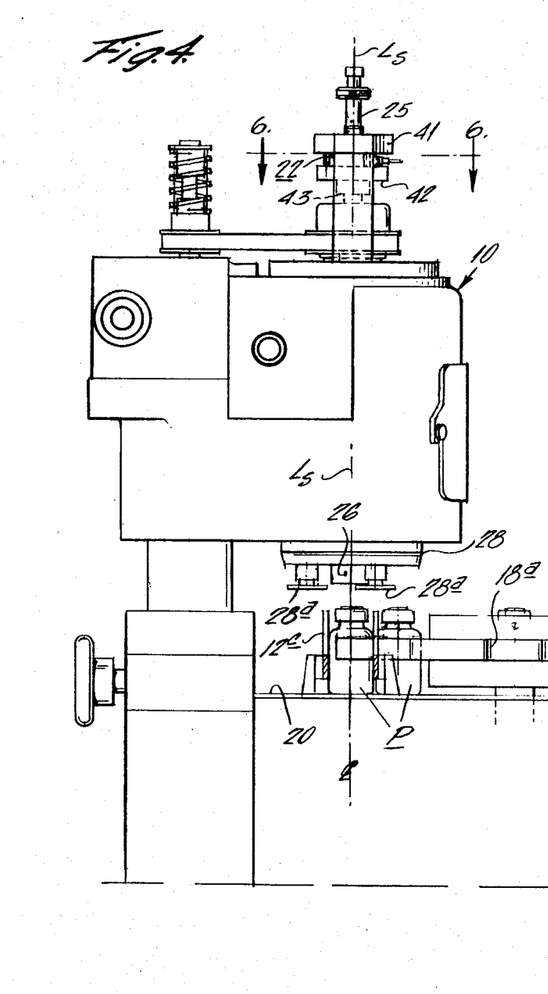
FIG. 4 is a side elevation view of the conveyed bottle line, the rotary indexing and positioning head and the capping and crimping mechanism.
Figures 5, 6:
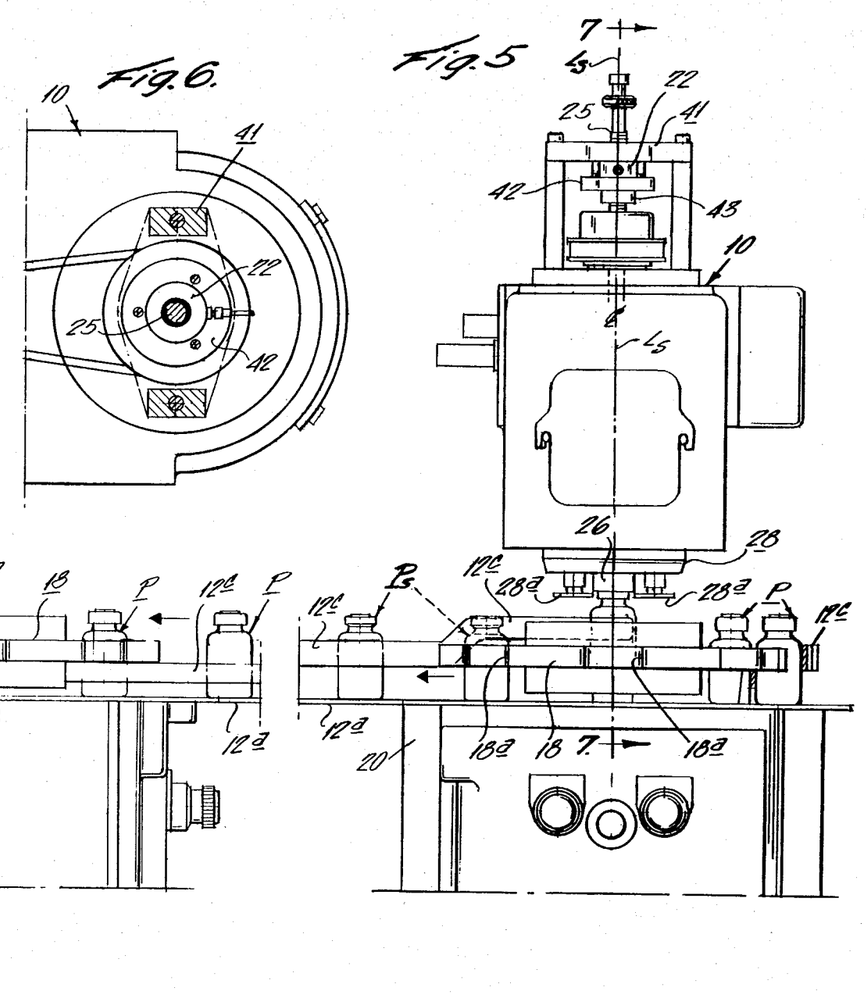
FIG. 5 is a front elevation view of FIG. 4.
FIG. 6. is a top view of a portion of the capping and crimping mechanism.

The system and method of the present invention are illustrated and described in association with a generally conventional capping machine illustrated in FIG. 1 generally designated by the numeral 10 which is adapted for use in a high speed assembly line system shown in FIG. $1^a$ for filling, capping and inspecting container closure assemblies P. The system includes a conveyor 12 for advancing container closure assemblies including an inlet section upstream of the capping machine having a filling station 14 for filling the bottles B and an assembly station 16 for positioning the stoppers and caps C on each filled bottle B and a discharge section downstream of the capping machine. The conveyor 12 comprises a belt $12^a$, to advance the container-closure assemblies P through the system and are stack fed into the capper and held in line by side guide rails $12^c$. The system further includes a rotating indexing wheel or star 18 having circumferentially spaced pockets $18^a$ for container-closure assemblies which intermittently rotates in timed relation to the operation of the capping machine and dwells at predetermined time intervals to allow for sealing each container-closure assembly P at the capping station. The discharge section includes means to be described in more detail hereafter for diverting improperly sealed container-closure assemblies to a reject station 19 and directing properly sealed assemblies for further processing including packaging for shipment.

Figure 7:
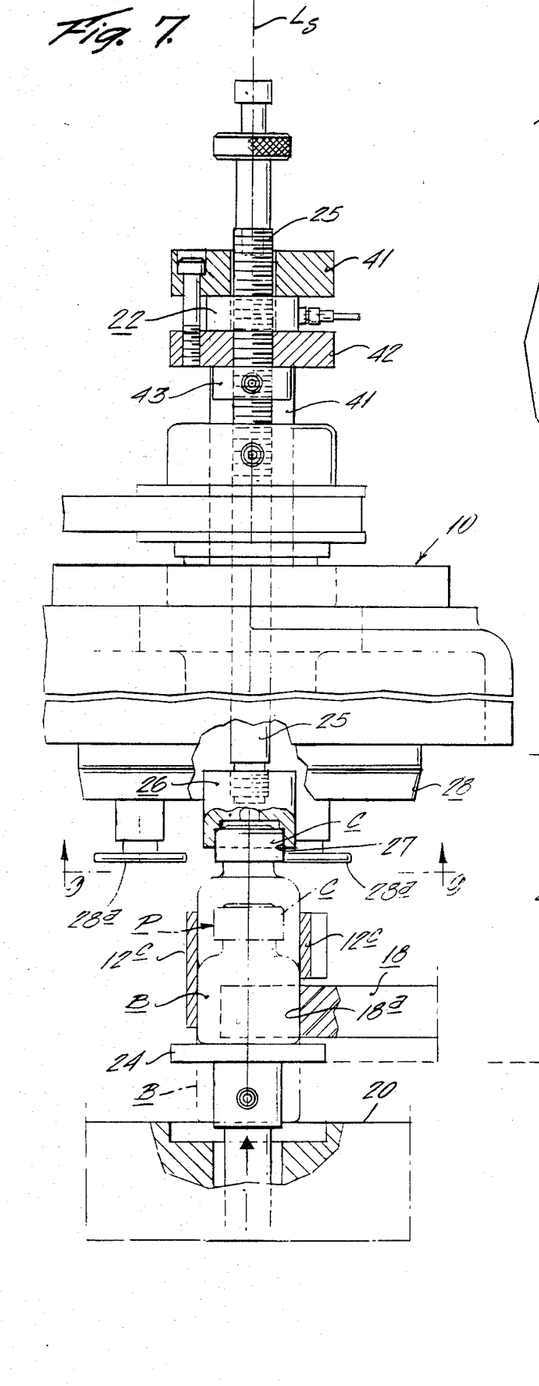
FIG. 7 is an enlarged cut-away front elevation view showing the container as it is raised onto the pressure block and the force transducer integrally mounted to the pressure block shaft.
Figure 8:
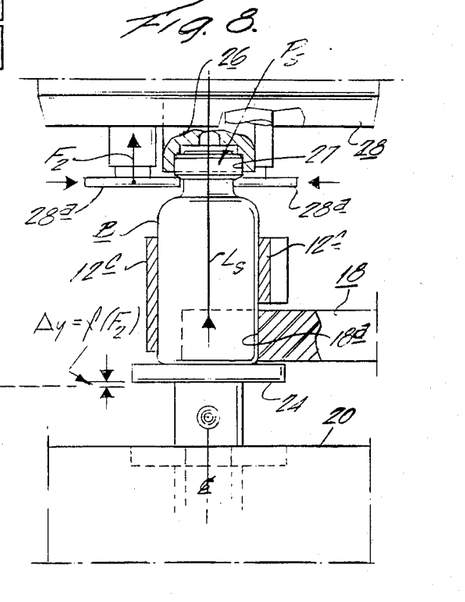
FIG. 8 shows the cap crimping mechanisms in the process of crimping a cap to the finish of a container.
Figure 9:
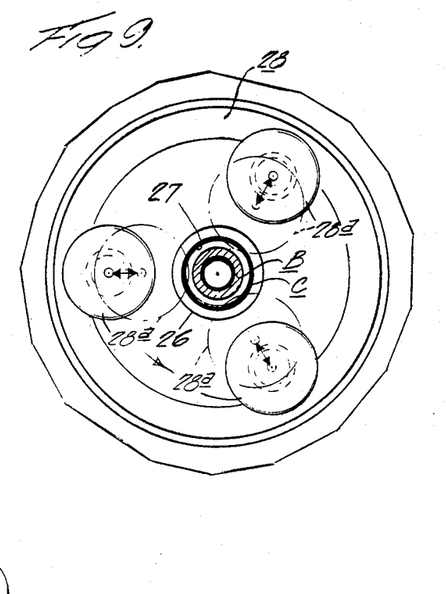
FIG. 9 is a view looking into the crimping mechanism and shows the retracted position in solid lines and the crimping position in phantom lines.

The capping machine as best illustrated in FIGS. 1, 4, 5 and 7 generally of the type known as PW-525 WEST-CAPPER shown in The West Company Bulletin 672 includes a main frame 20, the rotating indexing and positioning head 18 for delivering the container-closure assemblies to the capping station in a timed sequence. The capping station includes a mechanically actuated reciprocating bottle rest or platform 24 aligned with a pressure block 26 having a stepped cavity 27 which engages over the cap C in the manner shown in FIGS. 2 and 3 and a rotatable crimping head 28 having forming discs or rollers $28^a$ which crimp the lower edge of the skirt of the cap as shown in FIGS. 3 and 8. Considering now briefly the capping operation, when the indexing and positioning star 18 positions a container-closure assembly P on the bottle rest 24 at the capping station, the bottle rest 24 is displaced upwardly a predetermined distance against the pressure block 26 so that an externally applied force $F_e$ is applied to the container-closure assembly P compressing the resilient sealing element S. The rollers $28^a$ of rotating crimping head 28 then engage the lower edge of the skirt Cs to seal the cap C. The cap C serves as a clamp to maintain the resilient sealing element in a compressed state and thereby provide a seal between the resilient sealing element and the container adjacent the opening.

For a given container-closure assembly, the capping apparatus may be set or adjusted to provide the given displacement of the bottle rest and the proper action of the crimping head to provide a good seal. It has been found, however, that some containers packaged by mass production techniques are not adequately sealed. Further, it has been observed that the seal is controlled primarily by the capping equipment. For example, for a given cap, resilient sealing element and container assembly, the bottle raising means of the capping equipment is initially set to apply a predetermined force Fe to effect a given compression of the resilient sealing element to produce the proper seal. If the initial setting of the capping machine is incorrect, the seal produced is inadequate. For example, if the preload force Fe of the bottle raising means is too low, the resilient sealing element is not compressed sufficiently to seal and if too high there is the danger of metal seal distortion, dimpling of the top surface of the resilient sealing element or glass breakage. Even if the initial setting of the capping equipment is correct, the setting may require adjustment by the operator from time to time if these changes are inadvertently overlooked, inadequate sealing may result.

The present invention provides method, apparatus, and system for first applying the correct force to the resilient sealing element during the cap crimping interval, secondly measuring the applied force, and thirdly comparing the applied force to a predetermined standard known to provide an adequate acceptable seal and rejecting those containers which are improperly sealed. All of the above functions are performed in-process and with the exception of the sealing force applicator and ejector, all functions are performed electronically requiring no moving parts or manual operations thereby providing a much more reliable and judgment-free container sealing means for the detection of defects, such as missing stoppers or liners, missing caps, broken glass and containers requiring excessively high or low capping force. This system then arranges for the discharge of rejects or defective assemblies by means of the reject mechanism.

To this end, the Seal Force Monitor System (SFM) includes a force sensing means, in the present instance a piezo-electric crystal 22 and an electronic system which "instantaneously" measures the capping and sealing force as it is being applied to the container cap and compares it to a predetermined standard force-time curve. The electronic system also contains displays and readouts for visual inspection by the operator.

This system uses force transducer 22 (piezo-electric crystal) directly mounted to pressure block shaft 25 coupled to pressure block 26 inside the capping and sealing machine. The specific mounting means for the transducer 22 is best shown in FIG. 7 and as shown therein, the upper terminal end of the vertical extending shaft 25 is mounted to a support bracket 41 by means of a clamping pad 42 and a lock nut 43. The transducer 22 is clamped between support bracket 41 and pad 42. Pressure block shaft 25 is adjustable and held in place by lock nut 43. Vertical force components are translated along center line $L_s$ of shaft 25, sensed by the transducer 22 and voltage changes applied to the electronic logic circuits. During the time that the resilient seal is compressed and the cap is crimped to a container, the transducer produces analog electrical signals that are proportional to the force applied to the pressure block. These signals are sampled at a rapid rate and converted in near real-time to digital values. An accurate representation of the force applied to the cap during the compression and crimping cycle, a force-time curve, is thus obtained. (FIG. 10) The electronic system then compares the actual force values to a set of standard force values at discrete times in the compression and crimping cycle.

There are two methods of obtaining a reference force-time profile depending on whether the discrete logic or microprocessor based seal force monitor, hereafter SMF is in use. If the SFM employing discrete logic electronics is in use the reference force-time profile is obtained in the following manner. Resilient elements, caps, and containers are manually measured until a set of parts with dimensions corresponding to the "center-of-specification" values are obtained. This assembled container is then sealed and crimped by the capping machine which is pre-set so that the sealing process will produce an ideally sealed container. If necessary, adjustments are made to the sealing apparatus applied force by simply adjusting the bottle rest spring force Fe, rollers 28[a] and/or pressure block shaft 25 positions. This process is repeated until an ideally or center-of-specification sealed container is obtained. The force values for the ideally sealed container are then retained in memory and used as standard or reference values for in-process inspection.

If the SFM employing a microprocessor is in use, the reference force-time profile is obtained in the following manner. Resilient elements, caps and containers are measured and any number of sets of parts with dimensions corresponding to "within specification" values are obtained. These assembled containers are then sealed and crimped. The force values thus obtained on all of the acceptably sealed and crimped containers are averaged by the microprocessor and a single set of standard force values obtained and retained in memory.

The electronic memory in either SFM system therefore contains a standard digital representation of ideal force values and tolerance band as a function of time that are used as a reference against which subsequent sealing force values are compared. The system can then discharge containers as improperly sealed for example, those which exhibit a predetermined number of force measurements as out-of-limits of acceptability. The SFM system can be set up for any type of container, shape or size and seal force conditions merely by erasing the memory of previous reference values and introducing new values in the manner described.

Considering the apparatus and system of the present invention, the capping and sealing machine 10 is a standard apparatus modified to include piezo-electric crystal 22 as the force transducer mounted such that the pressure block 26 is in direct contact with it via shaft 25. A container-closure assembly P to be sealed and inspected for seal integrity is accurately positioned beneath the pressure block 26 by means of a conveyor system 12 and an indexing and positioning star 18 as shown in FIG. 1a.

As previously mentioned, the machine is calibrated and adjusted to produce the correct compression of the resilient sealing element to effect an adequate seal of the container. Similarly, all electronic components associated with measuring the applied compressive force on the resilient sealing element have been calibrated and adjusted and a nominal set of compressive force values have been stored in electronic memory.

Also, as previously mentioned the entire process of acquiring the force measurements and comparing those measurements to a predetermined standard occurs in the space of time required by the sealing machine to apply the correct compression force and crimp the cap to the container. Typically the time can be as little as ten (10) milliseconds.

Figure 10:
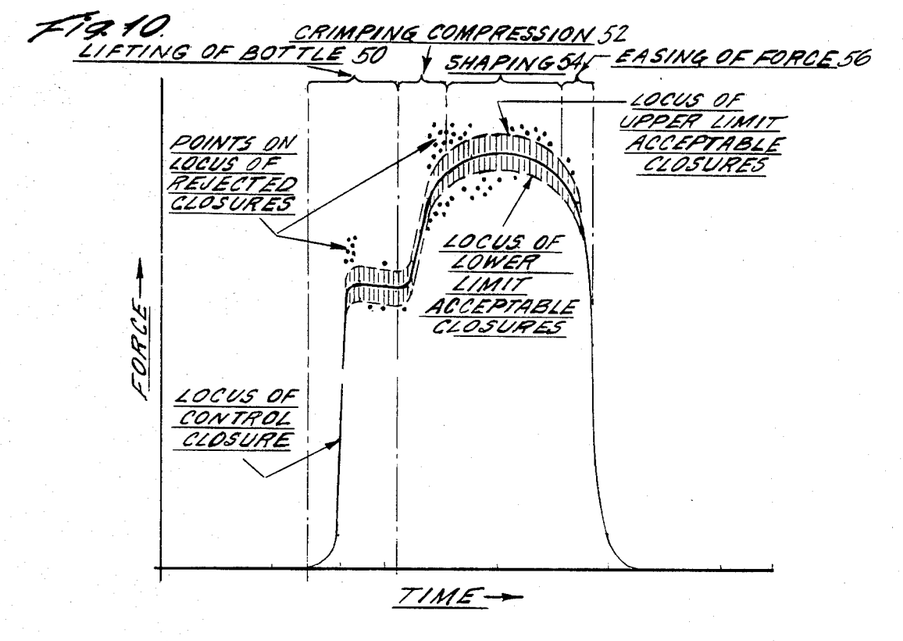

To facilitate understanding of the SFM system, the present embodiment will be described with the aid of a block diagram shown in functional form in FIG. 11, and a graphical representation of the applied seal force as a function of time as shown in FIG. 10. To further facilitate understanding, a single force sample will be traced through the system.

Turning first to the seal force-time curve of FIG. 10, that portion of the curve designated as 50 is characterized as the container is elevated and fitted into the pressure block cavity 27 formed in the lower terminal end of shaft 25. This initially applied force is primarily for seating the resilient sealing element in the container opening. The second compression cycle 52 is characterized as additional force is applied to the resilient sealing element and the apparatus crimps the metal cap to the underside of the container finish. This compressive force remains resident in the resilient sealing element effecting seal integrity. The crimped portion of the metal cap is then shaped and smoothed as characterized by that portion of the curve designated by 54. The compressive force is maintained during the shaping and smoothing process. Rollers 28$^a$ are then retracted and the sealed container assembly P released from the pressure block 26 with a subsequent easing of the applied force as shown on that portion of the curve characterized by 56.

Figure 11:
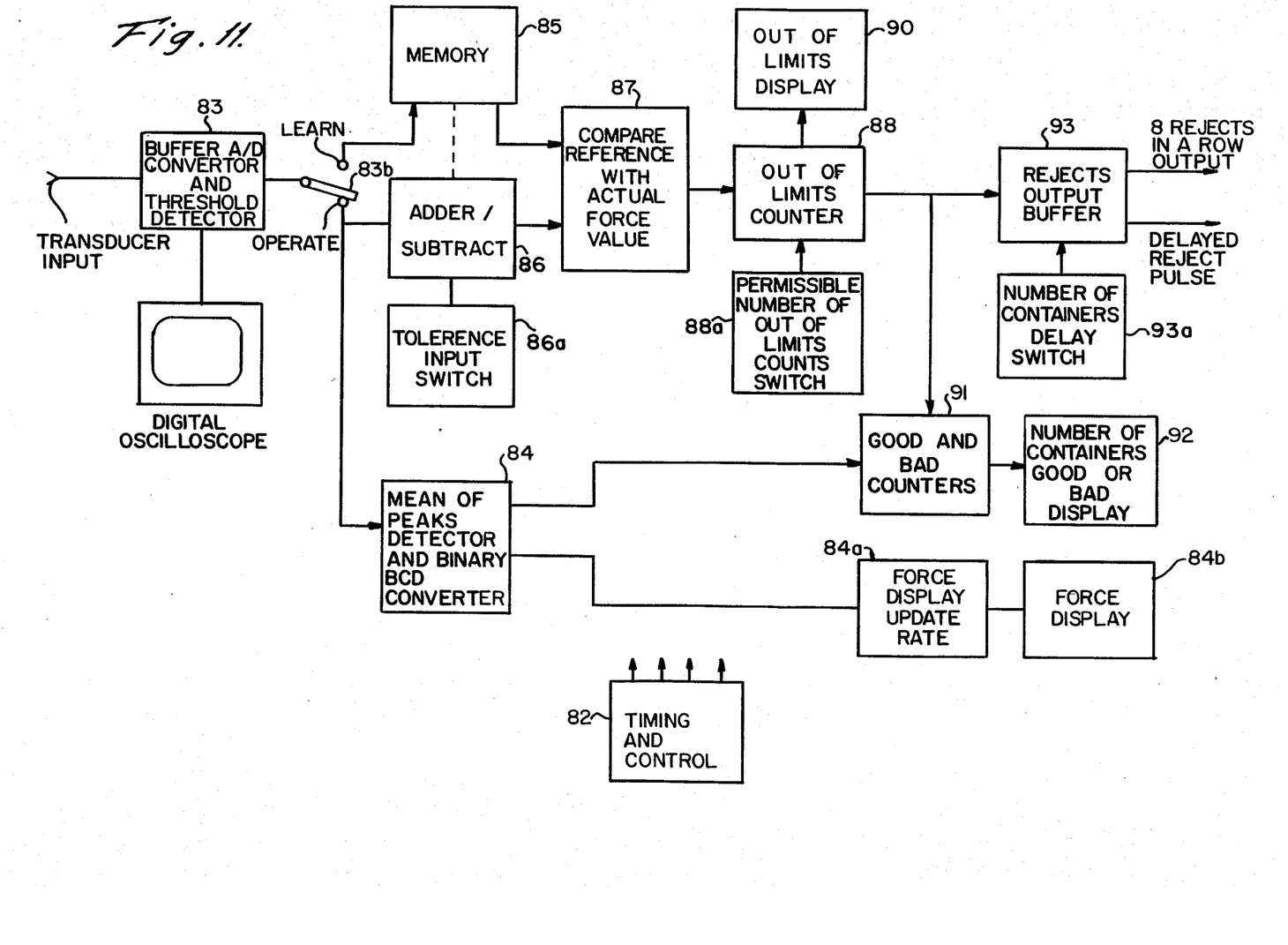
FIG. 11 is a block diagram of the seal force monitoring system of the present invention implemented with discreet components, logic circuits and firmware.

Considering now the SFM system more specifically and for convenience with particular reference to block diagram FIG. 11, shows the major functions which comprise the electronic system for detecting properly and improperly sealed containers. The input buffer, threshold detector and A to D converter 83 detect the signal level, control the sampling of the signal and convert the analog voltage signal to digital counts. The timing and control of all functions is provided by the Main Clock and Control Logic 82. The memory or storage circuitry 85, stores the standard or "center-of-specification" force values taken from an ideally sealed container. At the proper instant in time, these standard force values are compared with actual force values in comparator 87 after the actual force values have been operated on to obtain high and low values in the arithmetic function 86 and 86$^a$. The output of comparator 87 is therefore a signal which signifies an "out-of-limits" force values.

The Out-of-Limits Counter 88 counts the number of out-of-limits signals and generates three reject signal outputs when the predetermined number of permissible out-of-limits force values as set by 88$^a$ is reached. One output generated by Out-of-Limits Counter 88 triggers the out-of-limits Display and Alarm function 90. Another signal is routed to the Rejects Output Buffer 93, and a third signal is transmitted to the Good and Bad Counter 91. The Rejects Output Buffer 93 stores the reject signals and, in turn, generates two output signals. One output signal is generated when consecutive containers are rejected. The number of consecutively rejected containers can be varied by setting the desired numbers with the Number of Containers Delay Switches 93$^a$. This output signal can then be used to control a variety of functions such as shutting down the Capper. The other output signal controls the container reject mechanism by merely delaying the operation of the reject mechanism until the faulty container reaches the reject gate.

The signal transmitted to the Good and Bad Counter 91 can either designate a "good" container or a "bad or rejected" container. The Good and Bad Counter controls the Digital Display 92 which continually updates the "unit good count" and the "unit reject count" display.

Concurrently, the standard force-time curve and the actual force values of the container being sealed are displayed on digital readouts through functions 84, 84$^a$ and 84$^b$.

The electronic system as shown in FIG. 11 is initialized by the "center-of-specification" sealed container. The output of transducer 22 is transmitted in analog form to buffer 83 wherein the signal is converted to a digital word of 8 bits. Buffer 83 is a typical A to D converter well known in the art. The digitized signal is now stored in memory 85 and used as a reference against which all subsequent force signals are compared. The memory function is comprised of one thousand memory slots and is implemented with a nonvolatile RAM (random-access memory) which is a fixed memory and not subject to change by software. This function as previously described is implemented by a microprocessor under control of software. In the logic based SMF, the 8 bit force signal is stored in two 1k×4 bit R.A.M.'s such as a Texas Instrument 2114. The memory signal represents several points along analog force curve (FIG. 10), the selection of said points being determined by a periodic clocking signal enabling buffer 83. Acceptable tolerance values around the reference force measurements are set into the electronic system by switches 86$^a$. Switches 86$^a$ are shown in FIG. 11 to be connected to memory 85 through the add/subtract component 86 by a dotted line, signifying that switches 86$^a$ can be used to add or subtract tolerance values to either the reference signals stored in memory 85 or to the real time force measurements.

Turning our attention now to the end-to-end process, a description of a single measurement throughput follows.

The output of the force transducer 22 during the sealing/ crimping cycles is a continuously varying charge appropriately biased and amplified by circuitry (not shown) well known in the prior art. At a given instance in time controlled by a master synchronization clock 82, the signal from transducer 22 is sampled, buffered, and converted from an analog voltage level to digital 8 bit word. Although the accuracy of the digital signal is sufficient for this application, more or less than 8 bit digitization can be implemented depending on the accuracy desired.

When switch 83$^b$ is in the operate position, as shown in FIG. 11, the bit stream is conveyed to a sum and difference function 86 where the digitized actual force value is operated on by adding and subtracting the preset tolerance value to produce high and low force values to create a reference profile. Function 86 is primarily comprised of Texas instrument LS83 which adds or subtracts in response to a clock signal from timing and control function 82. The tolerance values inserted by switches 86A are outputted to function 86, also in response to a clock pulse from function 82. These high and low force values are thereafter multiplexed and transmitted to comparator function 87.

The high/low signals are thereafter multiplexed by Texas Instrument LS157 Quadruple 2-line to-1-line data separator/ multiplexer.

Simultaneous with the foregoing, memory 85 containing the standard nominal force values is addressed by a pulse from function 82 and the force value corresponding to the time of the foregoing instantaneous force sample is released from memory and transferred to comparator 87.

The comparator compares on a bit-by-bit basis the standard nominal force values to the high and low force values. Comparator 87 comprises two Texas Instrument LS85 4-bit magnitude comparitors arranged to compare two 8-bit signals. The output of comparator 87 will indicate one signal being greater than, less than or equal to the other signal. If the standard force value lies outside the reference profile, the out-of-limits counter function 88 is triggered. Alternatively and preferably, the standard force value can be operated on to create a reference profile which is compared with the actual force value. Function 38 comprises substantially two syncronous 4-bit up/down counters such as a TI LS193. The number of out-of-limits points are stored in buffer function 93, where they are counted, stored and compared to the permissible number of out-of-limits force points set into the system by the set switch function 88$^a$. Simultaneously, the out-of-limit force value is numerically displayed by the out-of-limits display function 90. When the number of out-of-limits points exceeds the permissible number, a reject signal is transmitted to container rejection mechanism 60 shown in FIG. 1$^a$, which automatically removes the faulty container from the conveyor line to reject station 17.

Concurrently with the above, the 8 bit stream is transmitted to peak detector and converter function 84 which conditions the digital bit stream for display on numeric display 84$^b$. This display is a visual aid to the operator.

At the same time the digital bit stream is routed to the accept/reject detection function 91 which detects, counts and stores the total number of containers with acceptable seals and the total number of containers with non-acceptable seals. These values are displayed on a numerical read-out 92 as a visual aid to the operator in determining the operating status of the system.

Figure 12:
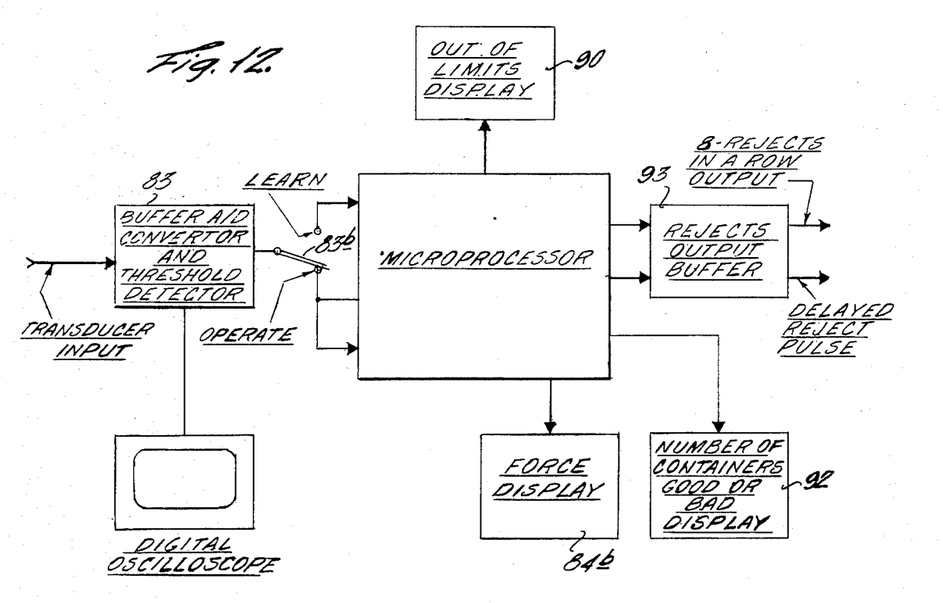
FIG. 12 is a block diagram of the seal force monitoring system of the present invention showing the processing, logic and control performed by a microprocessor under the control of software programs.

The foregoing describes an SFM electronic processing system comprised of discrete hardware components for inprocess inspection of properly and improperly sealed containers. These functions can also be implemented and performed by a computer under the control of software. As shown in FIG. 12, functions 85, 86, 86$^a$, 87, 88, 88$^a$, 91, and 93$^a$ are performed by a microprocessor such as one supplied by Advanced Micro Devices (AMD) of Sunnyvale, Calif. in its 2900 processor family. When so implemented the system is initialized by averaging of any number of acceptable sets of force-time values as previously explained.

As in the previous description, the output of the force transducer 22 during the sealing/crimping cycles is a continuously varying charge appropriately biased and amplified by circuitry (not shown) well known in the prior art. At a given instance in time controlled by a master synchronization clock 82, the signal from transducer 22 is sampled, buffered, and converted from an analog voltage level to digital 8 bit word.

When switch 83$^b$ is in the operate position, as shown in FIG. 12, the bit stream is conveyed to the microprocessor where the digitized force value is operated on to produce high and low force values. The tolerance values which in the previous description were manually inserted by switches 86$^a$ are stored in computer memory. These high and low force values are compared at the appropriate time with the standard set of force values stored in microprocessor memory.

Simultaneous with the foregoing, the microprocessor memory containing the standard nominal force values is addressed by a pulse from function 82 and the force value corresponding to the time of the foregoing instantaneous force sample is released from memory and compared to the actual force values of the container being sealed.

The microprocessor compares on a bit-by-bit basis the standard nominal force values to the high and low force values.

The output of comparator 87 will indicate one signal being greater than, less than or equal to the other signal. If the force value lies outside the standard nominal force value, the out-of-limits counter function 88 is triggered. The number of out-of-limits points are temporarily buffered where they are counted, and compared to the permissible number of out-of-limits force points set into the microprocessor memory. Simultaneously, the out-of-limit force value is numerically displayed by the out-of-limits display function 90. When the number of out-of-limits points exceeds the permissible number, a reject signal is transmitted to container rejection mechanism 60 shown in FIG. 1$^a$, which automatically removes the faulty container from the conveyor line to reject station 17.

Concurrently with the above, the microprocessor conditions the signal for display on numeric display 84$^b$. This display is a visual aid to the operator.

At the same time the microprocessor detects, counts and stores the total number of containers with acceptable seals and the total number of containers with non-acceptable seals These values are displayed on a numerical read-out 92 as a visual aid to the operator in determining the operational status of the system.

Even though the system described utilizes a particular type of capping machine, it is to be understood that the principle applies to other types. For example, the RW-500 WESTCAPPER shown in The West Company Bulletin 674 which is a rail type capping apparatus may be suitably modified to incorporate the force transducer at selected locations along the rail against which the caps are engaged to effect the crimping and sealing action.

Figure 13:
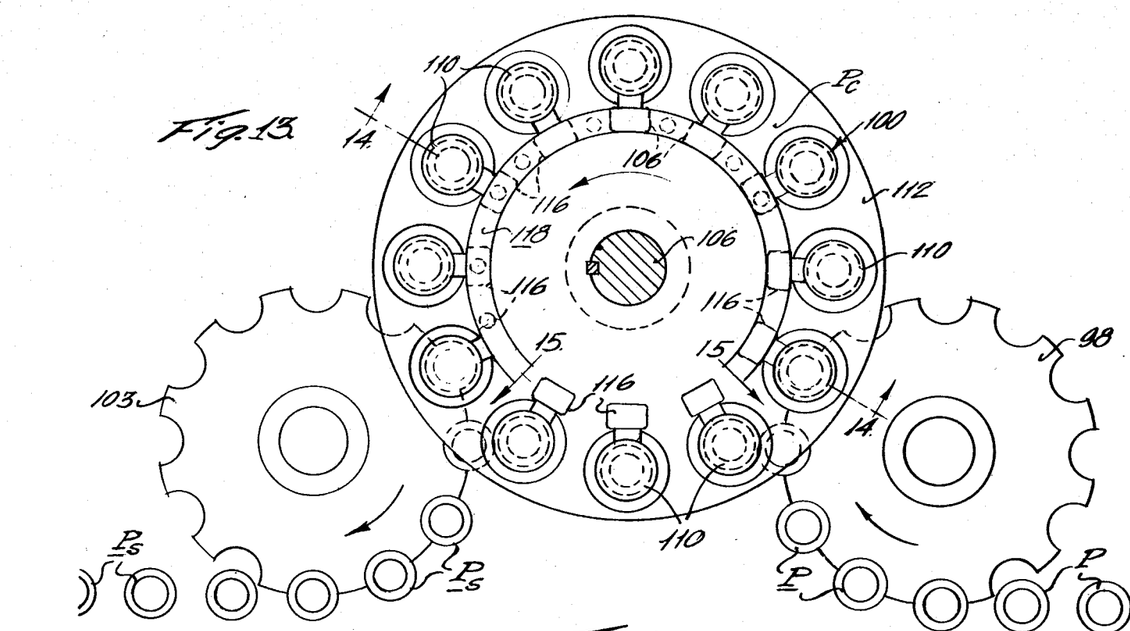
FIG. 13 is a fragmentary plan view of the capping station of a rail type capping apparatus incorporating seal force monitoring means in accordance with the present invention.
Figure 14:
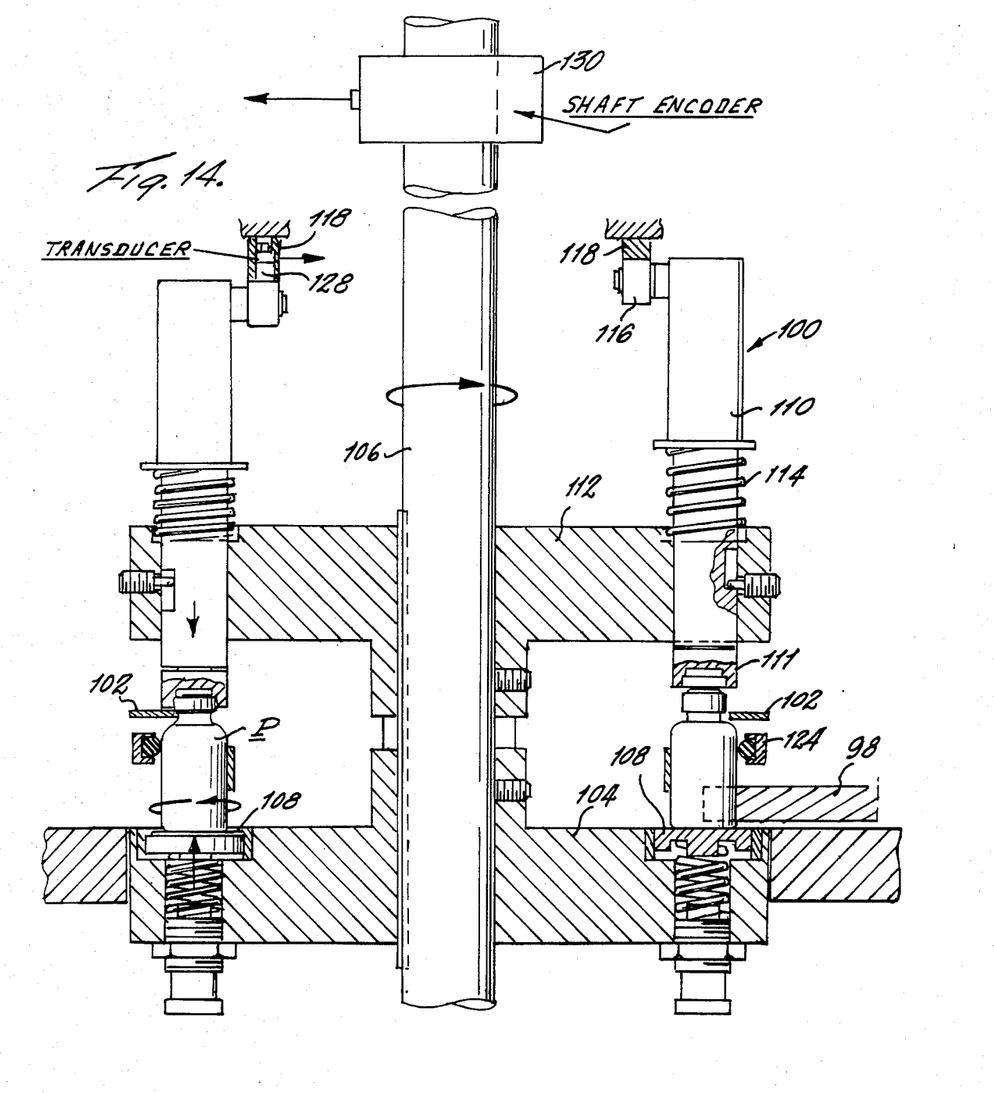
FIG. 14 is a sectional view taken on lines 14—14 of FIG. 13.
Figure 15:
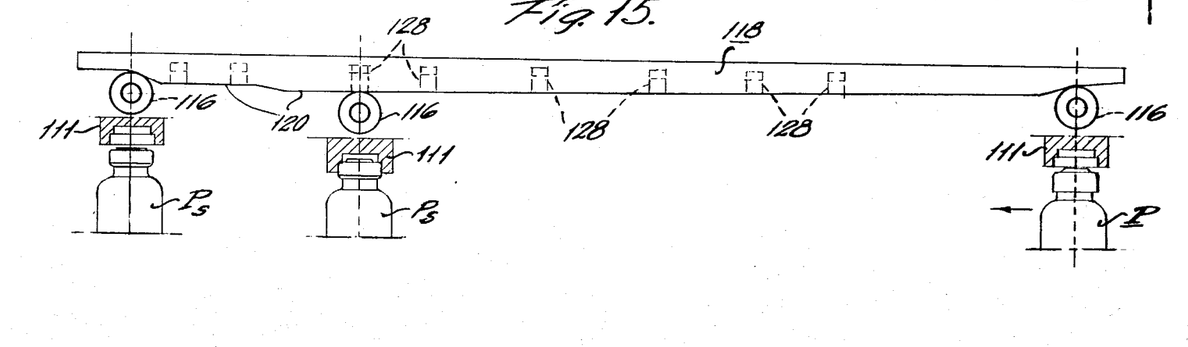
FIG. 15 is a development of the cam in the ram type capper.

The rail type capping apparatus is shown schematically in FIGS. 13-15. As illustrated in FIG. 13 container-closure assemblies P to be sealed are delivered by the conveyer system and star wheel 98 to the capping apparatus generally designated by the numeral 100 wherein they follow a circular capping path P$_c$ and during the course of traversing this path the container closure assemblies are rotated about their axes against a fixed flanging rail 102 which crimps the lower edge of the skirt C$_s$ of the cap C while an external compressive force F$_e$ is applied and maintained continuously during travel of the container-closure assemblies P along the circular capping path. Another star wheel 103 returns the sealed assemblies to the conveyor system. Specifically, the apparatus includes a mounting table 104 mounted on a rotatable shaft 106 disposed centrally of the circular capping path P$_c$ which has in the present instance a series of circumferentially spaced spring loaded bottle rests 108 on which the bottles B are positioned during the capping cycle and complementary spring loaded spindle pressure block assemblies 110 disposed at circumferentially spaced locations on a spindle mounting plate 112 likewise secured to the rotatable shaft 106. Each spindle pressure shaft block 110 includes a rotatable pressure block 111 and is aligned with a bottle rest 108 and is normally biased upwardly by spring means 114 so that a cam follower 116 associated with each of the spindle pressure blocks 110 is maintained in contact with an arcuate cam ring 118 having a profile configuration 120 to selectively vary the external force F$_e$ applied to the cap during the capping cycle.

As illustrated, the fixed flanging blade 102 is positioned so that the lower edge of the skirt C$_s$ of each cap C engages against the flanging rail 102 to crimp the skirt inwardly under the bottle finish as the bottle is rotated during the interval it traverses the circular capping path P$_c$ by engagement with a fixed rubbing rail 124 made of a resilient material such as rubber to engage the side of the bottle in the manner indicated with sufficient friction so that as the bottle rest mounting table 104 and spindle plate 112 rotate to move the assemblies in a circular path, the bottle B is rotated about its central axis along with the bottle rests 108 and pressure block 111. The cone shaped rotating pressure blocks 111 are replaceable for different size container closure assemblies P.

A series of force transducers 128 are mounted in the cam ring 118 to sense and transmit the forces applied to the container closure assemblies P during the capping cycle and transmit the same in the manner described hereafter.

As previously stated, the external compressive force Fe is applied to the resilient sealing element through the spindle pressure block shaft which has a cam follower or roller fixed to the spindle body that rolls along the lower cam surface of the rail cam. The rail cam is ridgedly fixed to the capper machine body and is designed so that as the roller follows the rail cam profile the compressive force applied to the resilient sealing element duplicates the force-time profile shown in FIG. 10. Applied force measurements are acquired by the series of transducers 128 displayed at various locations along the rail cam. The capper operates in a manner such that at any instant in time, a plurality of spindle pressure heads with containers can be engaged with the rail cam with each container at a different stage in the compression-crimping cycle. A feature of this embodiment is the provision of an encoder (130) attached to the central shaft 106 of the mounting table 104 for locating the angular position of each spindle and container. With the data from the shaft encoder 130, the microprocessor now has a means of matching the applied force data with the appropriate container.

Figure 16:
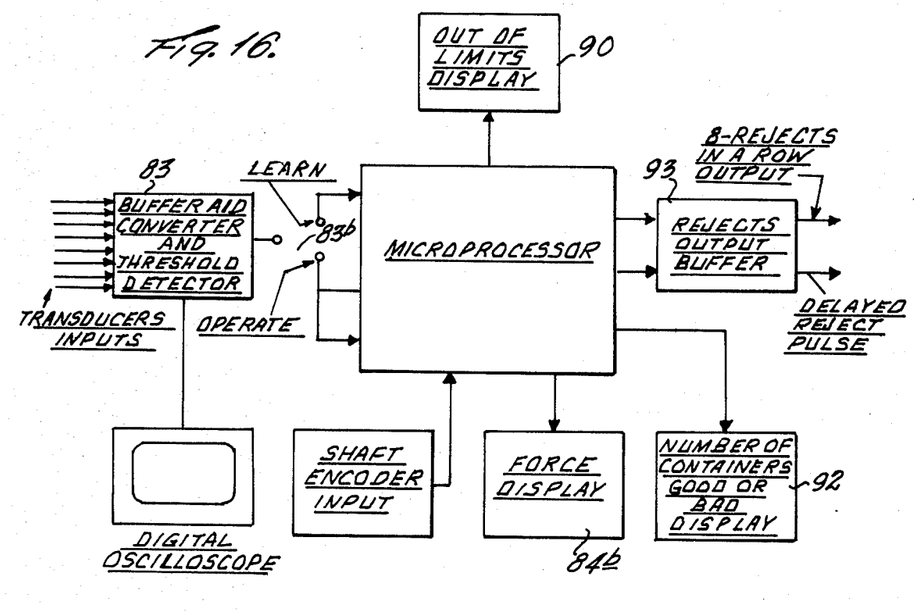
FIG. 16 is a block diagram similar to FIG. 12 showing schematically the processing system for a rail type capping apparatus.

As the individual containers traverse the rail cam, signals from the transducers are generated in the identical manner as previously described and are aggregated to produce a set of applied force-time values that are subsequently compared to a standard reference set of force-time values. Containers are then accepted or rejected based on the number of out-of-limits force values. While this entire process of acquiring the force values, operating on them to produce high and low limits, comparing those values to a standard reference set and rejecting unacceptable containers is more easily implemented with a microprocessor based system under the control of software (see FIG. 16), a system based on the use logic circuitry such as that previously described can also be employed.

While particular embodiments of the present invention have been illustrated and described herein, it is not intended to limit the invention and changes and modifications may be made therein within the scope of the following claims.

What is claimed is:

1. A method for determining the integrity of a sealed container-closure assembly having a resilient sealing element supported in a sealed condition on the container by a closure applying force to secure the closure to the container during a closure applying cycle, generating a series of electrical force applying signals corresponding to the applied force and at predetermined spaced time intervals during said cycle, comparing the series of electrical force applying signals to a corresponding series of reference signals known to represent a profile of an acceptably sealed container and generated at generally the same spaced time intervals as the force applying signals, and indicating an unacceptably sealed container when a predetermined number of the force applying signals fall outside the reference profile.

2. A system for determining the integrity of sealed container-closure assemblies in a system for applying closures having a resilient sealing element to a container, said system comprising force applying means for positioning said container and for securing said closure to said container in a closure operation and apparatus for monitoring said closure operation, said apparatus comprising:

force sensing means, connected to said force applying means, for sensing the force used in securing said closure to said container and for generating a force signal reflective of said force;

reference means for generating a reference signal reflective of the force used during a closure operation of an acceptably sealed container-closure assembly;

comparison means, connected to said force sensing means and said reference means, for comparing the force signal generated at a plurality of points during said closure operation to corresponding points of said reference signal and for generating a comparison signal each time said force signal and said reference signal are not within a predetermined range; and counting means, connected to said comparison means, for counting the comparison signals and generating an indication signal when the number of comparison signals for single closure operation, exceeds a preselected number.

3. The system of claim 2 wherein said force generating means comprises at least one force transducer operatively associated with said positioning and securing means.

4. The system of claim 2 further comprising means to add and subtract a preselected tolerance from said reference signal, prior to said comparison means operating thereon.

5. A system as claimed in claim 2 wherein said comparison means includes a microprocessor.

6. The system of claim 2, wherein said reference signal comprises a series of reference values forming a reference profile signal and wherein said comparison means generates a comparison signal each time said force signal falls outside said reference profile signal.

7. The system of claim 2, wherein said force applying means comprises a rail capping apparatus comprising a fixed flanging rail and wherein said force sensing means comprises a plurality of force transducers mounted along said fixed flanging rail, so that the force applied to said container closure assemblies engaging said fixed flanging rail is sensed as said container-closure assembly passes each of said force transducers.

8. The system of claim 2, further comprising means for displaying said force signal and said reference signal.

9. The system of claim 2, further comprising means to add and subtract a preselected tolerance to and from said force signal, prior to said comparison means operating thereon.

10. The system of claim 2, further comprising a rejection means, connected to said counting means, for rejecting the sealed container-closure assemblies identified by said indication signal as having a number of comparison signals which exceed said preselected number.

* * * * *